May 24, 1966 A. BRUEDER 3,252,538
LONGITUDINAL-ELASTICITY SUSPENSION SYSTEM
Filed May 23, 1963 2 Sheets-Sheet 1
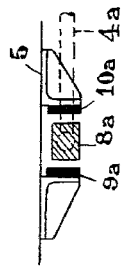
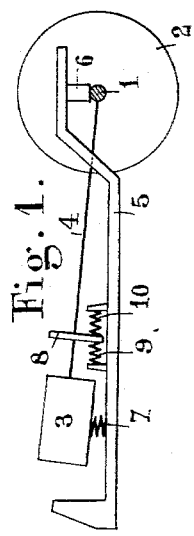
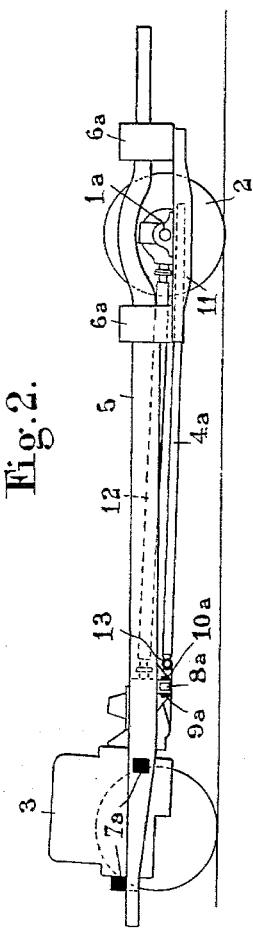
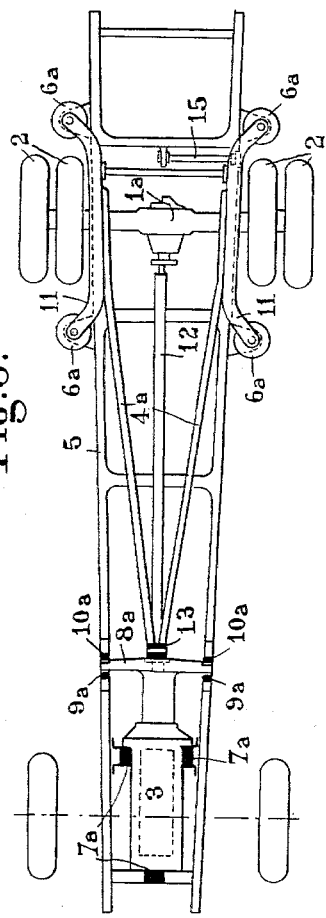

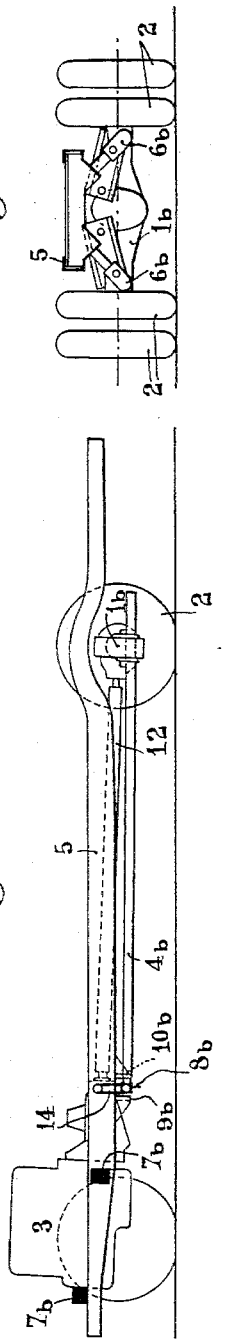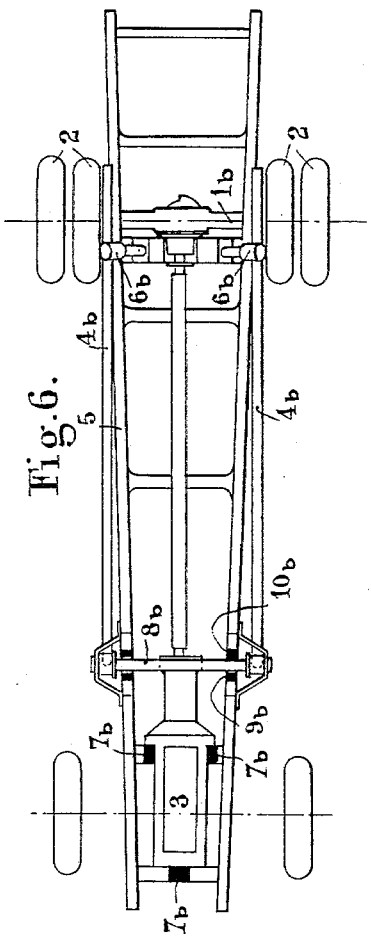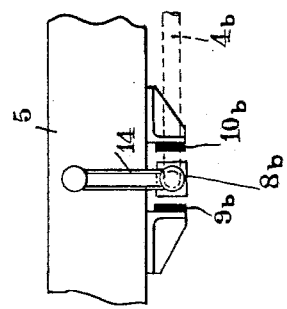

United States Patent Office 3,252,538
Patented May 24, 1966

3,252,538
LONGITUDINAL-ELASTICITY SUSPENSION
SYSTEM
Antoine Brueder, Paris, France, assignor to Societe
Anonyme Andre Citroen, Paris, France
Filed May 23, 1963, Ser. No. 282,631
5 Claims. (Cl. 180—64)

A prior Patent 3,089,558, issued May 14, 1963, recites a suspension system for an automotive vehicle which is adapted to damp out low-amplitude, high-frequency longitudinal vibrations impressed to the drive wheels by the reactions to which the tires are subjected during their driving action as a consequence of road unevennesses and of impulse variations caused by variations in the useful wheel diameter which occur during tire compression and expansion.

It is a specific object of said prior application to provide means for damping out longitudinal vibrations in the drive wheels through a fully or partially rigid connections between the drive wheels and the engine, thereby transmitting the longitudinal reactions applied to the drive wheels themselves to an assembly constituting a mass considerably greater than that of said drive wheels.

It is a further object of said prior application to utilize this form of absorption of longitudinal vibration in an automotive vehicle of the type wherein the frame is suspended relative to the drive wheels through a leaf-spring suspension system.

It is the chief object of the present application to use the same general method of damping out longitudinal vibrations of the drive wheels on a vehicle of the type in which the frame is suspended relative to said drive wheels through a pneumatic or hydropneumatic suspension system.

Reference will now be made to the accompanying drawings illustrating diagrammatically two preferred forms of embodiment of the invention. In the drawings:

FIGURE 1 is a very diagrammatic side elevational view showing a vehicle incorporating the basic elements of the vibration damping system used in the two forms of embodiment of the invention which are shown and described herein;

FIGURE 2 is a side elevational view, from which the body and two wheels are removed, of an automotive vehicle equipped with the vibration damping system of this invention, according to a first form of embodiment thereof;

FIGURE 3 is a plan view from beneath of the same assembly with the wheels left thereon;

FIGURE 4 is a diagrammatic section showing on a larger scale a detail of the structure illustrated in FIG. 2;

FIGURES 5 and 6 are views corresponding to FIGS. 2 and 3 respectively and showing an automotive vehicle equipped according to a second form of embodiment of this invention;

FIGURE 7 is an end view showin the same vehicle as seen from the rear; and

FIGURE 8 shows on a larger scale and in section a constructional detail of the structure illustrated in FIG. 5.

The same reference numerals are used throughout the figures of the drawings for designating similar or corresponding component elements.

Referring to the diagram of FIG. 1, the drive axle 1 carrying the drive wheels 2 of the vehicle is connected to the engine or power unit 3 of the vehicle through a rigid member 4. The frame 5 is supported by the drive axle 1 through intermediate pneumatic or hydropneumatic suspension devices 6 and the engine 3 is supported in turn by the frame 5 through resilient members 7 adapted to damp out the vertical oscillation of the engine. Moreover, the rigid connecting member 4 provided between the drive axle 1 and the engine 3 is solid with a rigid member 8 extending between two resilient members 9, 10 provided for damping out the horizontal movements of the assembly comprising the engine or power unit 3, the drive axle 1 and the drive wheels 2 in relation to the frame 5.

In the form of embodiment illustrated in FIGS. 2, 3 and 4, the drive axle 1ª carrying the drive wheels 2 is solid with a suspension cradle 11 on which the frame 5 is caused to bear resiliently through the medium of pneumatic or hydropneumatic suspension cylinders 6ª. This suspension cradle 11 is retained in the transverse direction by a transverse positioning bar 15 having its ends secured through resilient pivot means on the frame 5 and on this cradle 11, respectively. In the longitudinal direction, the suspension cradle 11 is rigidly connected through coupling bars 4ª to a cross bar 8ª rigidly coupled in turn to the engine 3.

The longitudinal movements of this cross bar 8ª relative to the frame 5 are limited at either end by a pair of resilient pads 9ª, 10ª carried by the frame 5 on either side of this bar and corresponding to the resilient connecting members 9 and 10 of FIG. 1. As shown more in detail in FIG. 4, a certain play is left between these resilient pads 9ª, 10ª and the relevant ends of cross bar 8ª, whereby the assembly comprising the power unit 3, the suspension cradle 11, the drive axle 1ª and the drive wheels 2 can perform very small longitudinal movements between these resilient pads. The power unit 3 is mounted on the frame of the vehicle through the medium of resilient pads 7ª adapted to damp out the vertical oscillation of the engine relative to the frame. The drive motion is transmitted from the power unit 3 to the drive wheels 2 through a conventional shaft 12 transmitting no other effort than the engine torque. It will be seen that in this construction the assembly comprising the power unit 3, the coupling bars 4ª, the suspension cradle 11, the drive axle 1ª and the drive wheels 2 constitutes a rigid structure of which the substantial mass distributes the impulses impressed to the road by the wheels 2, the resultant impulse transmitted by this assembly to the frame being damped out by the resilient pads 9ª, 10ª. If desired, the coupling bars 4ª, 4ª may be connected to the cross bar 8ª through elastic pivot means 13.

In the alternate form of embodiment shown in FIGS. 5 to 8 inclusive a rear suspension system having a high transverse stability comprises two inclined hydropneumatic cylinders 6ᵇ, 6ᵇ through which the frame 5 is caused to bear on the drive axle 1ᵇ. This drive axle 1ᵇ is further rigidly connected through coupling bars 4ᵇ, 4ᵇ to a cross bar 8ᵇ supported at its side ends by shackles 14 suspended through pivot means from the frame 5 as shown more particularly in FIG. 8, the longitudinal movements of this bar 8ᵇ being limited by rubber or like resilient pads 9ᵇ, 10ᵇ. A certain play is provided between the pads 9ᵇ, 10ᵇ and the cross bar, as in the preceding form of embodiment, for the same purpose and with the same result.

The power unit 3 is secured on the frame 5 as in the preceding form of embodiment with resilient pads 7ᵇ, 7ᵇ,7ᵇ interposed therebetween for damping out the vertical oscillation of this power unit relative to the frame.

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and appended claims.

What I claim is:

1. In an automotive vehicle comprising a frame, a drive axle, two drive wheels carried by said drive axle, a cradle solid with said drive axle, pneumatic suspension cylinders through which said frame is caused to bear on said cradle so as to damp out the vertical oscillation of said frame, a transverse positioning bar approximately parallel to said drive axle and having two ends, resilient pivot means connecting one of said ends to said frame and resilient pivot means connecting the other said end to said cradle to restrain relative movement of said frame and cradle in a lateral direction while permitting relative movement in a direction longitudinal of the vehicle, a power unit, and resilient means for supporting said power unit on said frame and damping out the vertical oscillation of said power unit relative to said frame, an arrangement for damping out the longitudinal vibration of said drive wheels, said arrangement comprising a cross bar rigid with said power unit, a pair of coupling bars secured to said cross bar, said coupling bars extending like the prongs of a fork toward said drive wheels and having end portions fastened to said cradle, and rubber pads carried by said frame on either side of said cross bar with a slight play in relation to said cross bar.

2. An arrangement for damping out longitudinal vibration of the drive wheels of an automotive vehicle, as set forth in claim 1, wherein said two coupling bars are rigidly secured on said cross bar.

3. An arrangement for damping out longitudinal vibration of the drive wheels of an automotive vehicle, as set forth in claim 1, wherein resilient pivot means are provided between said coupling bars and said cross bar.

4. In an automotive vehicle comprising a frame, a driving axle, two driving wheels carried by said driving axle, pneumatic means for supporting said frame on said driving axle while damping out the vertical oscillations of said frame, means acting between said driving axle and said frame to restrain relative movement of said driving axle and frame in a lateral direction while permitting relative movement in a direction longitudinal of the vehicle, an engine, and resilient means for supporting said engine on said frame and damping out the vertical oscillations of said engine on said frame, means for damping out the longitudinal high-frequency vibrations impressed to said driving wheels by road unevennesses, said vibration damping means comprising a cross bar rigid with the engine, a pair of coupling bars rigidly carried by said cross bar, said coupling bars extending towards said driving wheels and having their opposite ends rigidly anchored on said driving axle and connecting means for resiliently associating said cross bar to said frame in the longitudinal direction, the elastic characteristics of said connecting means being so determined, with due consideration for the mass of the assembly rigid with the engine, which consists of said cross bar, said coupling bars, said driving axle and said driving wheels, as to impart to said assembly an inherent frequency of longitudinal oscillation in relation to said frame which is equal to the frequency of the vibrations to be damped out.

5. In an automotive vehicle comprising a frame, a driving axle, two driving wheels carried by said driving axle, pneumatic means for supporting said frame on said driving axle while damping out the vertical oscillations of said frame, means acting between said driving axle and said frame to restrain relative movement of said driving axle and frame in a lateral direction while permitting relative movement in a direction longitudinal of the vehicle, an engine, and resilient means for supporting said engine on said frame and damping out the vertical oscillations of said engine on said frame, means for damping out the longitudinal vibrations of said driving wheels, said last-named means comprising a cross bar rigid with the engine, two coupling bars rigidly carried by said cross bar and extending towards said driving wheels and having their end portions rigidly connected to said driving axle, and pads of elastic material carried by said frame on either side of said cross bar.

References Cited by the Examiner

UNITED STATES PATENTS

| | | | |
|---|---|---|---|
| 1,221,248 | 4/1917 | Trott | 180—85 |
| 1,247,745 | 11/1917 | Trott | 180—64 |
| 1,890,871 | 12/1932 | Trott | 180—64 |
| 2,180,860 | 11/1939 | Brown. | |
| 2,180,876 | 11/1939 | Kuhn | 180—57 X |
| 2,184,933 | 12/1939 | Brown | 180—73 |
| 2,622,872 | 12/1952 | Wettstein | 267—64 |
| 2,912,235 | 11/1959 | Walker | 280—124 X |
| 3,089,558 | 5/1963 | Brueder | 180—64 |

BENJAMIN HERSH, *Primary Examiner.*

A. HARRY LEVY, PHILIP ARNOLD, *Examiners.*

M. L. SMITH, *Assistant Examiner.*